United States Patent
Seevers et al.

(10) Patent No.: US 6,446,869 B1
(45) Date of Patent: Sep. 10, 2002

(54) AMBIENT LIGHT BLOCKING APPARATUS FOR A PRODUCE RECOGNITION SYSTEM

(75) Inventors: Daniel B. Seevers, Duluth, GA (US); Scott B. Henry, Loganville, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/501,932

(22) Filed: Feb. 10, 2000

(51) Int. Cl.[7] .................................... G06K 7/10
(52) U.S. Cl. .................. 235/462.43; 235/462.01; 235/462.06; 235/462.13; 235/462.43; 235/455
(58) Field of Search ................ 235/383, 462.01, 235/462.43, 455, 462.06, 462.13

(56) References Cited

U.S. PATENT DOCUMENTS

| | | | | |
|---|---|---|---|---|
| 3,930,994 A | * | 1/1976 | Conway et al. | 209/74 |
| 4,106,628 A | * | 8/1978 | Warkentin et al. | 209/74 |
| 4,146,135 A | * | 3/1979 | Sarkar et al. | 209/546 |
| 4,693,330 A | | 9/1987 | Uchimura et al. | 177/25 |
| 5,151,581 A | * | 9/1992 | Krichever et al. | 235/467 |
| 5,166,755 A | | 11/1992 | Gat | 356/419 |
| 5,231,278 A | * | 7/1993 | Kuo | 235/462.43 |
| 5,440,428 A | * | 8/1995 | Hegg et al. | 359/630 |
| 5,494,136 A | * | 2/1996 | Humble | 235/383 X |
| 5,546,475 A | | 8/1996 | Bolle et al. | 382/190 |
| 5,609,223 A | * | 3/1997 | Iizaka et al. | 235/383 X |
| 5,732,495 A | * | 3/1998 | Lowe et al. | 24/30.5 T |
| 5,867,265 A | | 2/1999 | Thomas | 356/328 |
| 5,900,617 A | * | 5/1999 | Dvorkis et al. | 235/472.01 |
| 5,992,570 A | * | 11/1999 | Walter et al. | 186/36 |
| 6,069,696 A | * | 5/2000 | McQueen et al. | 235/383 |
| 6,073,852 A | * | 6/2000 | Seo | 235/472.01 |
| 6,155,489 A | * | 12/2000 | Collins, Jr. et al. | 235/462.01 |
| 6,260,023 B1 | * | 7/2001 | Seevers et al. | 235/378 |
| 6,296,186 B1 | * | 10/2001 | Spencer et al. | 235/462.01 |
| 6,313,917 B1 | * | 11/2001 | Tang et al. | 356/402 |
| 6,332,573 B1 | * | 12/2001 | Gu et al. | 359/640 |

FOREIGN PATENT DOCUMENTS

| | | | |
|---|---|---|---|
| JP | 403123979 A | * | 5/1991 |
| WO | 9746856 | | 12/1997 |

* cited by examiner

Primary Examiner—Karl D. Frech
Assistant Examiner—Daniel Walsh
(74) Attorney, Agent, or Firm—Paul W. Martin

(57) ABSTRACT

An ambient light blocking apparatus which minimizes contamination of produce data collector readings by ambient light. The apparatus preferably includes a tunnel member which may be located around a produce illumination window in the top surface of a scale weigh plate of an item checkout device containing the produce data collector, or around a produce illumination window in the produce data collector itself.

7 Claims, 6 Drawing Sheets

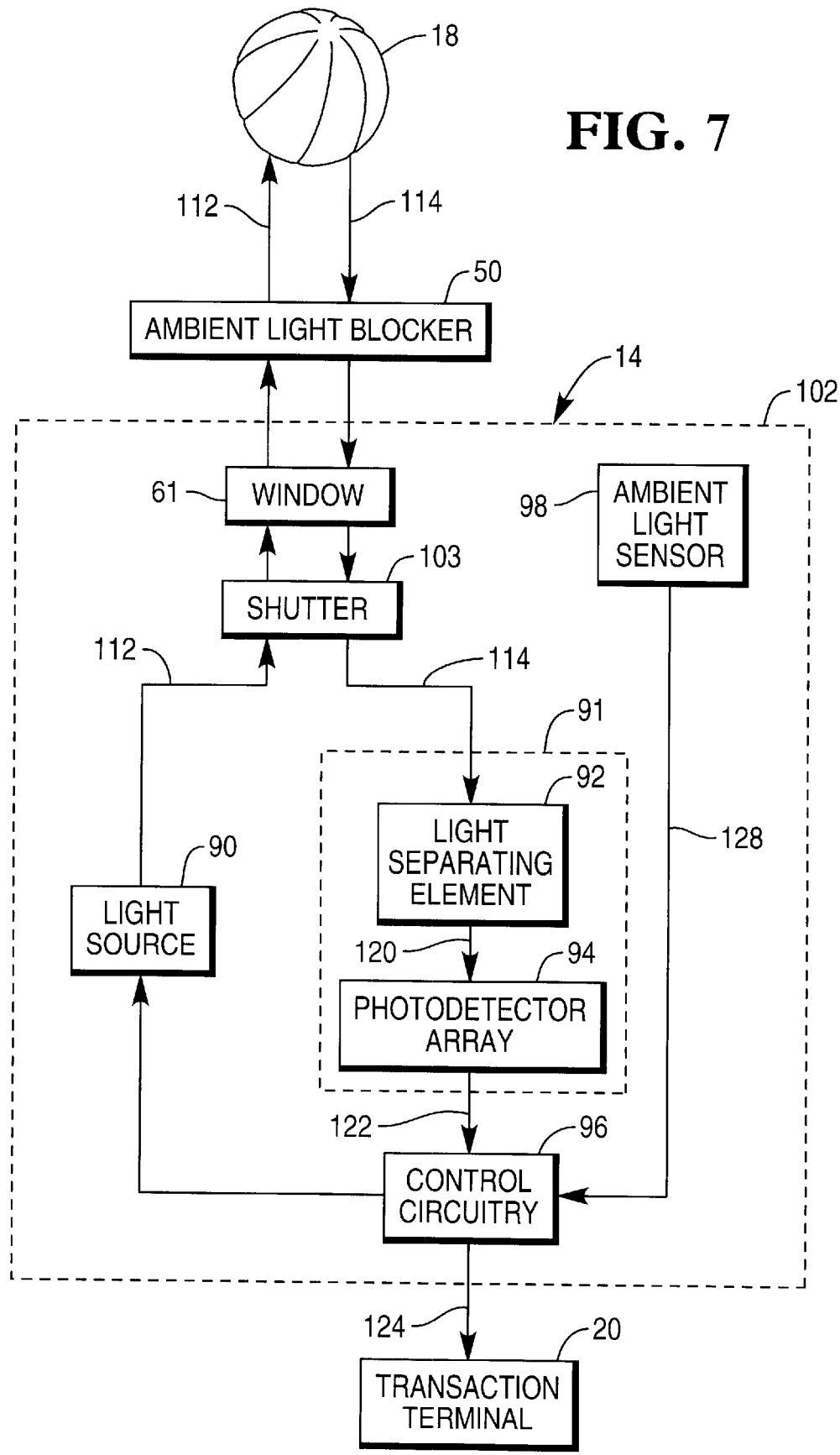

AMBIENT LIGHT BLOCKING APPARATUS FOR A PRODUCE RECOGNITION SYSTEM

CROSS-REFERENCE TO RELATED APPLICATIONS

The present invention is related to the following commonly assigned and co-pending U.S. application:

"An Item Checkout Device Including A Bar Code Data Collector And A Produce Data Collector", filed Nov. 10, 1998, invented by Collins, and having a Ser. No. 09/189,781.

BACKGROUND OF THE INVENTION

The present invention relates to product checkout devices and more specifically to an ambient light blocking apparatus for a produce recognition system.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items. Operator identification methods are also prone to error, on the order of fifteen percent. A produce recognition system was proposed in the related co-pending application. This application discloses a produce data collector which is integrated into a bar code reader. A scale weigh plate rests on a load cell and contains a window through which a produce item is illuminated. Light reflected from the produce item is analyzed to determine the identity of the produce item.

Since produce items come in a variety of shapes, they do not always fully cover the window in the weight plate. Ambient light passes into the produce data collector via exposed portions of the window. Varying ambient light levels may not only contaminate produce readings, it may also cause the produce data collector to initiate readings when a produce item is not present or fail to initiate readings when a produce item is present.

Therefore, it would be desirable to provide an apparatus which minimizes intrusion of ambient light during produce readings.

SUMMARY OF THE INVENTION

In accordance with the teachings of the present invention, an ambient light blocking apparatus for a produce recognition system is provided.

The apparatus preferably includes a tunnel member which may be located around a produce illumination window in the top surface of a scale weigh plate of an item checkout device containing the produce data collector, or around a produce illumination window in the produce data collector itself.

In the preferred embodiment, the tunnel member is made of a flexible material. One end of the tunnel member substantially conforms to a shape of the produce item. The other end conforms to the shape of the produce data collector or scale weigh plate. Thus, both ends form seals which block substantially all of ambient light.

The tunnel member is preferably mounted to the produce data collector or scale weigh plate. For this purpose, a retainer may be used. In the preferred embodiment, the retainer includes an inverted L-shaped member. The tunnel member is stretched over the inverted L-shaped member. The retainer may be integral to the produce data collector or scale weigh plate, or it may be a separately attached component.

A method of blocking ambient light from entering a produce data collector while the produce data collector is illuminating a produce item includes the steps of surrounding an aperture in a surface of the produce data collector by one end of a tunnel member which conforms to a shape of the surface of the produce data collector, and engaging the produce item by another end of the tunnel member which conforms to a shape of the produce item.

It is accordingly an object of the present invention to provide an ambient light blocking apparatus for a produce recognition system.

It is another object of the present invention to provide an apparatus for minimizing contamination of produce data collector readings by ambient light.

It is another object of the present invention to provide an apparatus for minimizing triggering problems of a produce data collector due to ambient light.

It is another object of the present invention to provide an ambient light blocking apparatus which is easy to clean.

It is another object of the present invention to provide a flexible tunnel member around a produce data collection window.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 7 is a block diagram of the produce data collector; and

DETAILED DESCRIPTION OF THE PREFERRED EMBODIMENT

Figure 1:
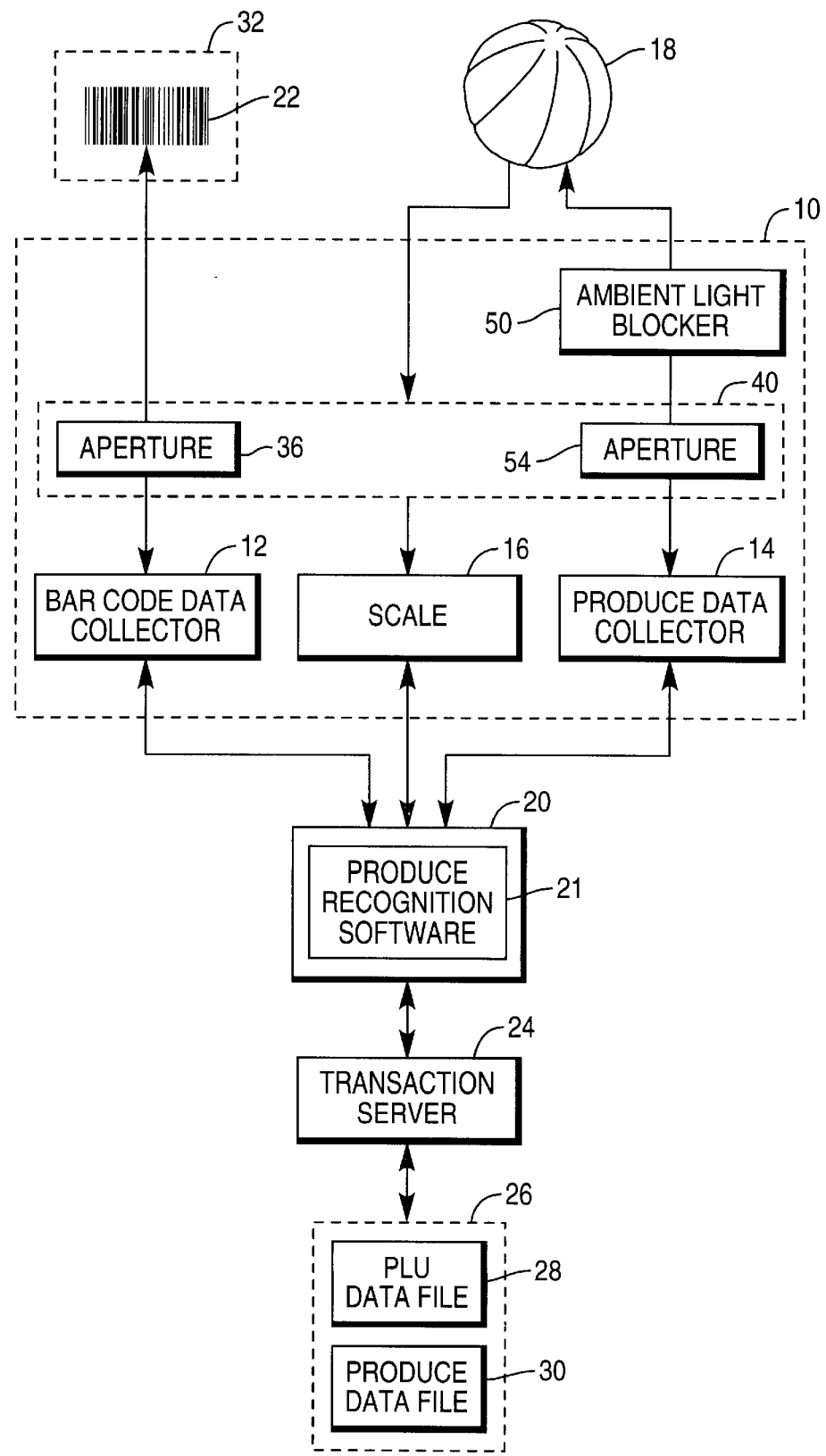
FIG. 1 is a block diagram of a transaction processing system including an item checkout device containing a produce data collector.

Referring now to FIG. 1, item checkout device 10 includes bar code data collector 12, produce data collector 14, scale 16, weight plate 40, and ambient light blocker 50.

Bar code data collector 12 reads bar code 22 on merchandise item 32 to obtain item identification information, also known as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-bar-coded merchandise item. Such data may include color and color distribution data, size data, shape data, and aromatic data. Reference produce data is collected and stored within produce data file 30. During a transaction, produce data is collected and compared to produce data within produce data file 30.

Scale 16 determines a weight for produce item 18. Scale 16 sends weight information for produce item 18 to transaction terminal 20 so that transaction terminal 20 can determine a price for produce item 18 based upon the weight information.

Weigh plate 40 rests upon scale 16 and covers bar code data collector 12 and produce data collector 14. Weigh plate 40 includes apertures 36 and 54 which allow bar code data collector 12 and produce data collector 14 to illuminate item 32 and item 18, respectively.

Figure 8:
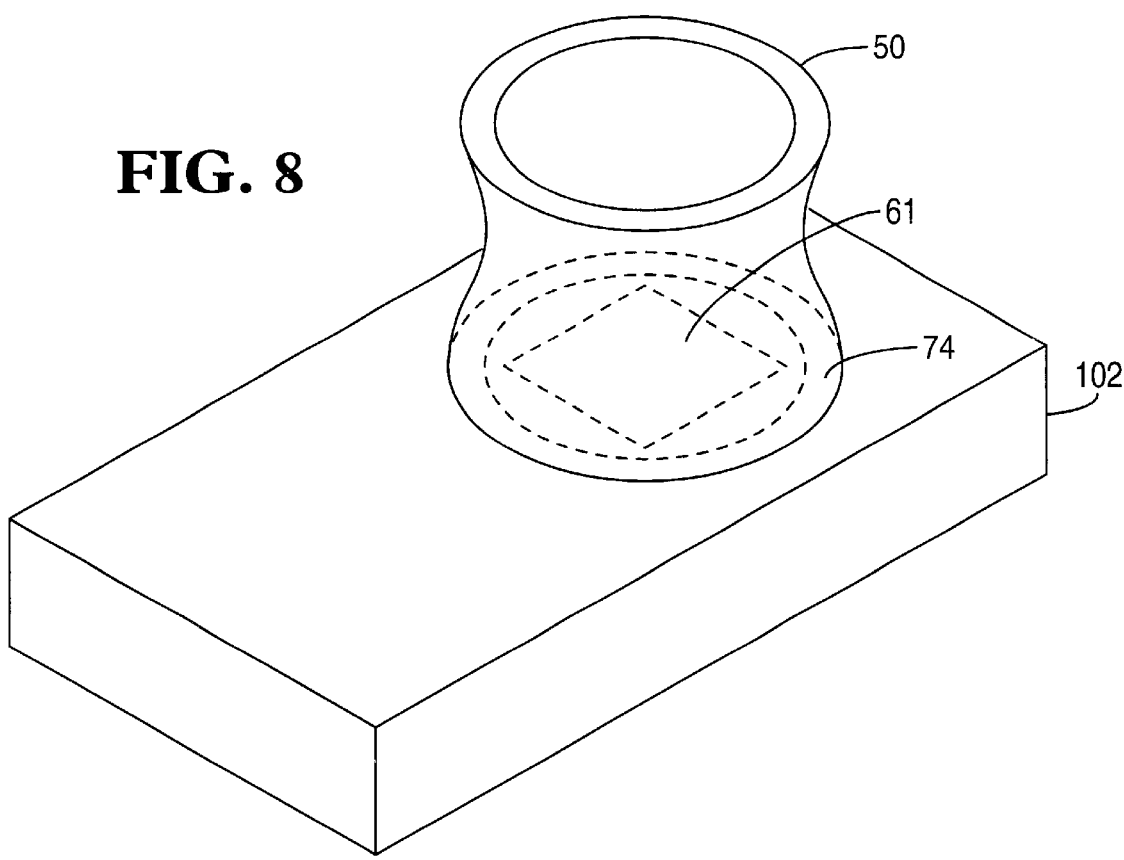
FIG. 8 is a perspective view of the produce data collector illustrating an alternative placement of the ambient light blocking apparatus.

Ambient light blocker 50 is located over aperture 54 and seals out ambient light when produce item 18 is over aperture 54. Ambient light blocker 50 may also be located directly over produce data collector 14 when scale 16 is not present (FIG. 8).

Transaction terminal 20 obtains price information for both bar coded and non-bar coded items from transaction server 24. In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce data from produce data collector 14, identifies produce item 18 by comparing produce data in produce data file 30 with collected produce data, retrieves an item identification number from produce data file 30 and a corresponding price from PLU data file 28.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20.

In either case, transaction server 24 sends a corresponding unit price from PLU data file 28 to transaction terminal 20. Transaction terminal 20 calculates a price for produce item 18 by multiplying the unit price by the weight of produce item 18 obtained from scale 16.

PLU data file 28 and produce data file 30 are stored within storage medium 26, but either may instead/also be located instead at transaction terminal 20 or checkout device 10.

Figure 2:
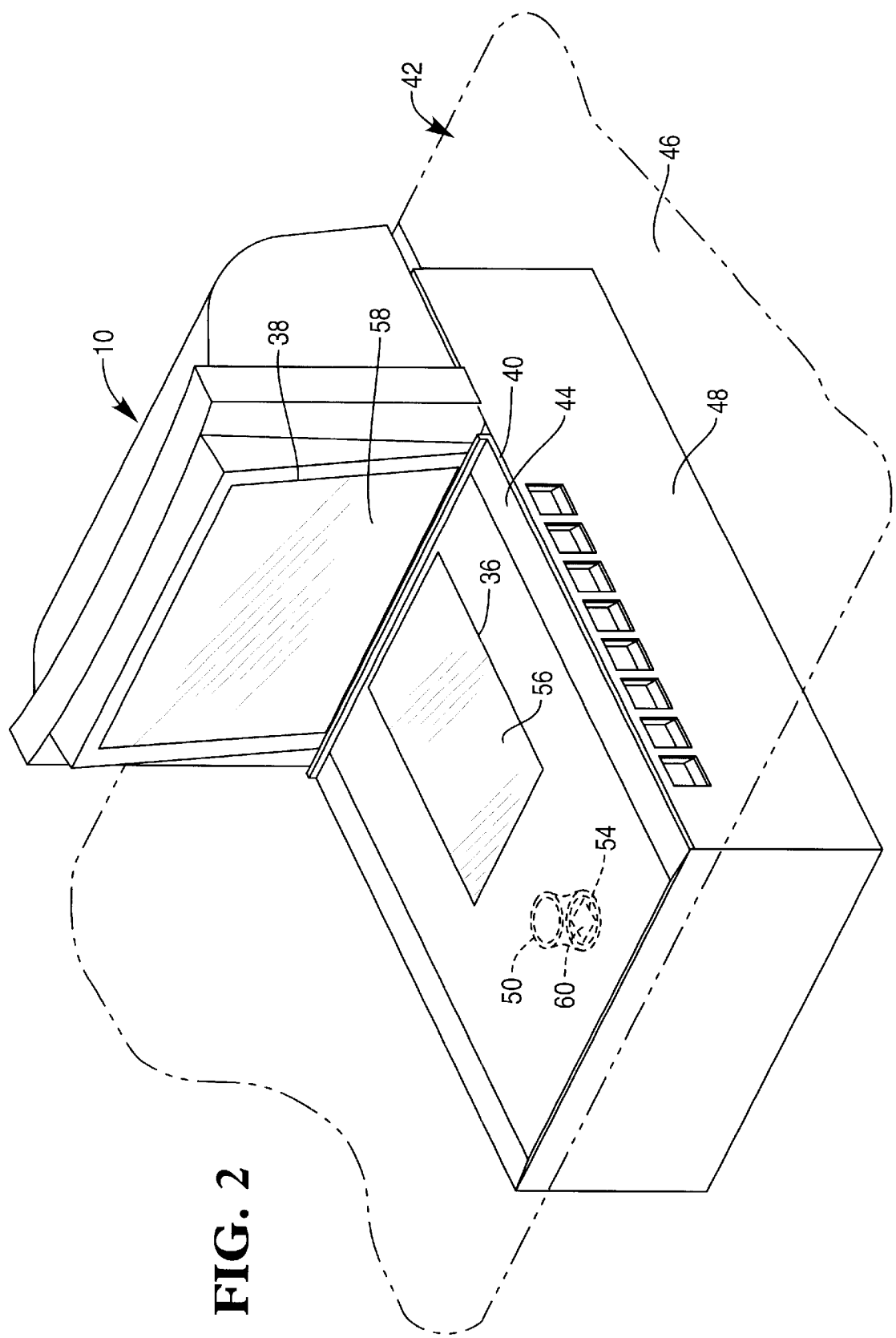
FIG. 2 is a perspective view of the item checkout device illustrating a preferred placement of the ambient light blocking apparatus.
Figure 3:
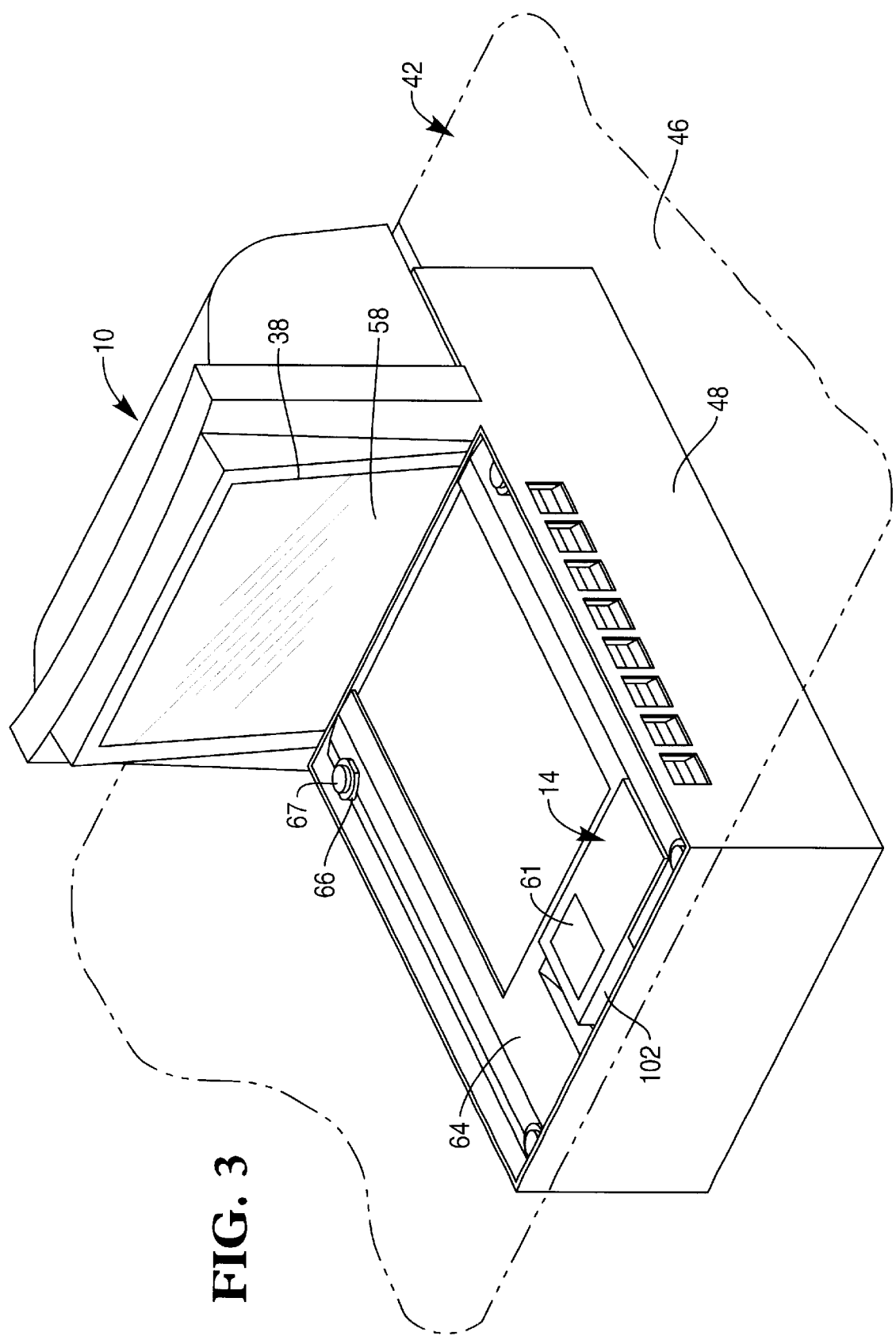
FIG. 3 is a view of the item checkout device of FIG. 2 without the scale weigh plate.

Turning now to FIGS. 2–3, device 10 includes housing 48, which is adopted from a housing from a model 7875 dual-aperture optical bar code scanner manufactured by the assignee of the present invention. Housing 48 includes vertical aperture 38. Aperture 38 includes transparent window 58 made of glass.

Housing 48 is mounted within checkout counter 42 so that top surface 44 of weigh plate 40 is substantially flush with top surface 46 of checkout counter 42. Apertures 36 and 54 of weigh plate 40 include transparent windows 56 and 60 made of glass. Transparent window 60 includes an anti-reflective surface material to prevent light generated by produce data collector 14 from contaminating collected produce data.

With reference to FIG. 3, produce data collector 14 directs light through aperture 61 and aperture 54 towards produce item 18. Reflected light from produce item 18 passes through apertures 54 and 61 and is used by transaction terminal 20 to identify produce item 18.

Produce data collector 14 includes housing 102 which is mounted within support frame 64. Housing 102 is approximately five and a half inches in length by two and three quarters inches in width by one and three quarters inches in height. Support frame 64 fastens to housing 48, but does not obstruct operation of bar code data collector 12 or scale 16. Frame 64 is generally U-shaped so as not to obstruct a laser beam directed towards aperture 36. Frame 64 also includes apertures 66 through which scale support members 67 pass unhindered. Thus, the presence of frame 64 does not affect scale readings.

Advantageously, produce data collector 14, including housing 102, does not interfere with the operation of bar code data collector 12. Bar code data collector 12 fits within the available space in housing 48. Thus, produce data collector 14 may be easily added to an existing bar code reader without expensive optical design changes to bar code data collector 12.

Figure 4:
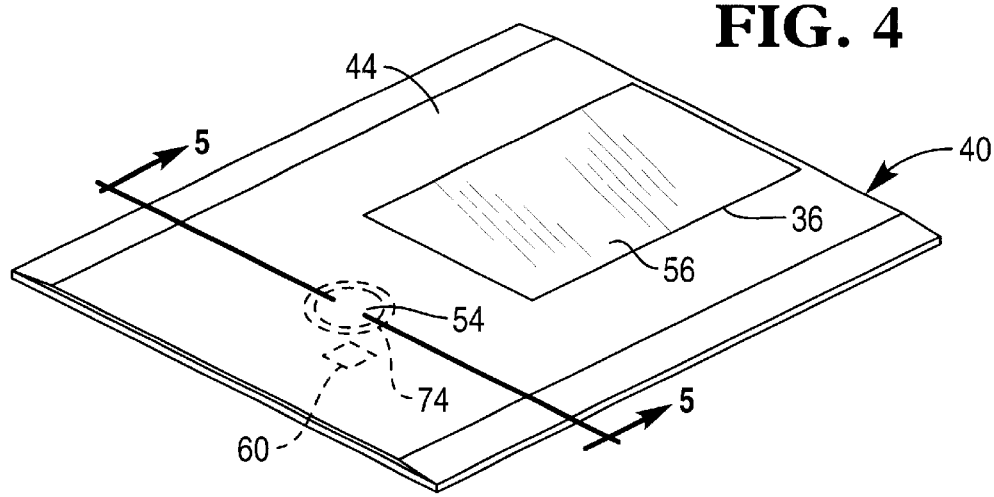
FIG. 4 is a view of the scale weigh plate of FIG. 2, illustrating the ambient light blocking apparatus.
Figure 5:
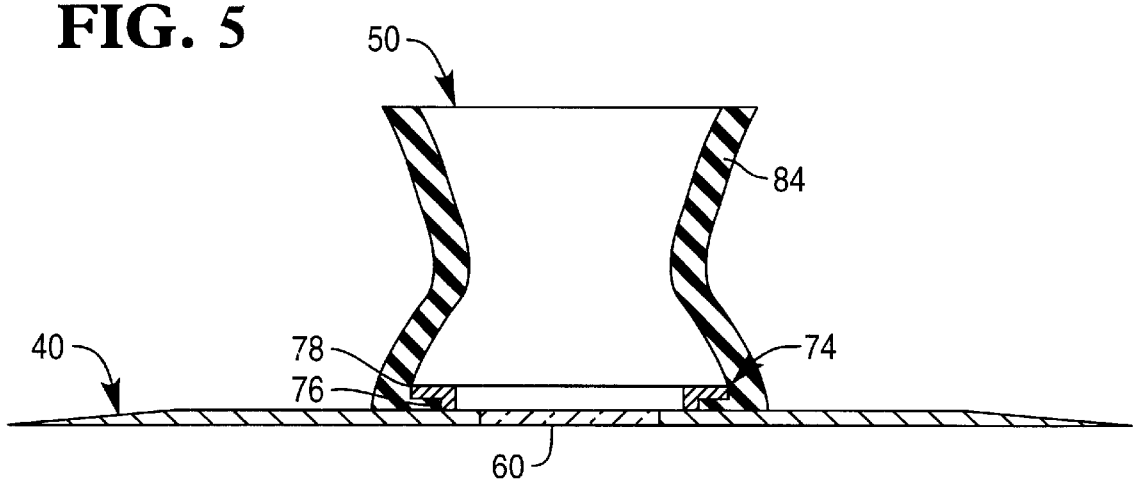
FIG. 5 is a cross-sectional view of the scale weigh plate and ambient light blocking apparatus.
Figure 6:
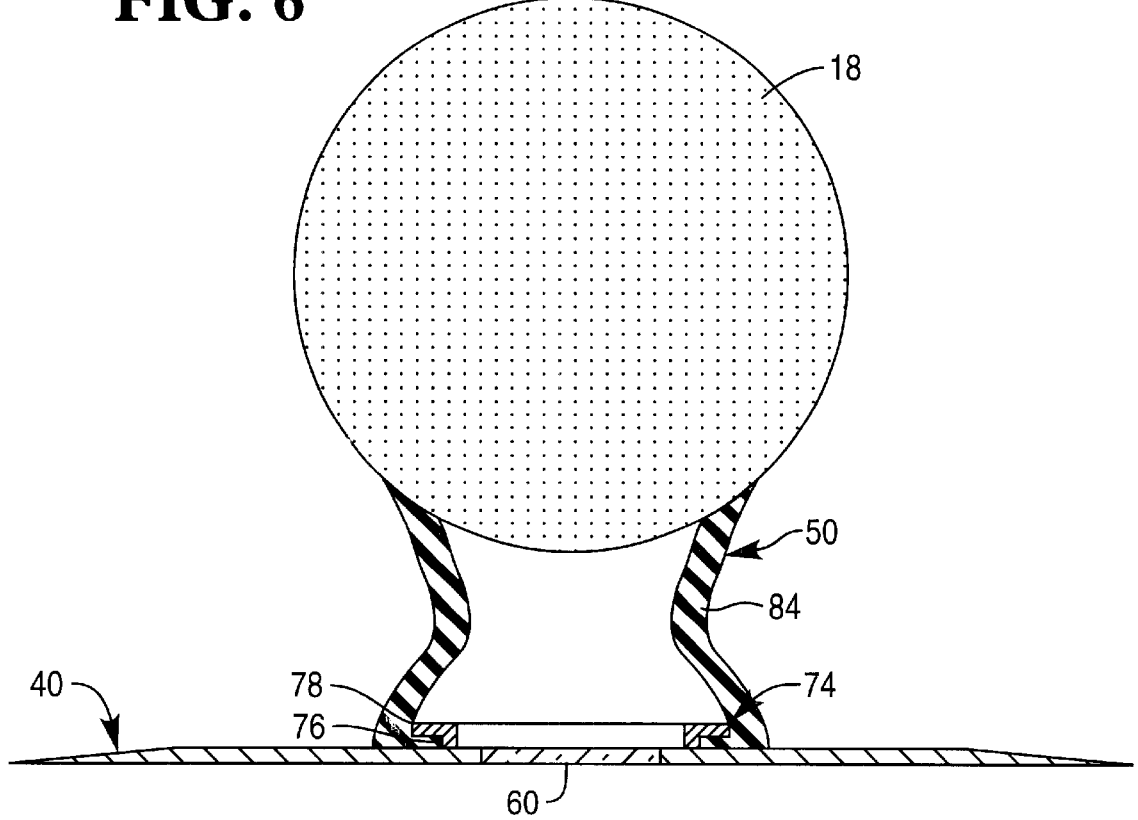
FIG. 6 is a cross-sectional view of the scale weigh plate and ambient light blocking apparatus in position within the item checkout device.

Turning now to FIG. 4–6, ambient light blocker 50 of the present invention is illustrated in detail. Ambient light blocker 50 minimizes intrusion of ambient light around produce item 18 into produce data collector 14. Ambient light blocker 50 is located around window 60, but may also be located around window 61 of produce data collector 14 when produce data collector 14 is used without scale 16 and weigh plate 40 (FIG. 8).

The preferred embodiment of ambient light blocker 50 includes a hollow bezel with a concave or hourglass-shaped wall 84. Ambient light blocker 50 is preferably made of a flexible material, such as rubber. The flexibility and concave shape of wall 84 allow ambient light blocker 50 to conform to the shapes of various produce items 18. Other shapes are also envisioned. Any tunnel or tunnel-shaped member is envisioned.

In the preferred embodiment, weigh plate 40 provides anchors for ambient light blocker 50 in place. Top surface 44 of weight plate 40 includes mounting ring 74 around window 60. Mounting ring 74 includes a generally cylindrical wall portion 76 and a larger generally cylindrical retaining portion 78. Together, wall portion 76 and retaining portion 78 have a cross-section which is generally similar to an inverted L-shape. Retaining portion 78 retains apparatus 50 to mounting ring 74. Mounting ring 74 may alternatively be mounted to produce data collector 14.

Advantageously, ambient light blocker 50 may be easily installed and replaced using an expanding or stretching motion around retaining ring 78. The diameter of mounting ring 74 is slightly larger than the diameter of the bottom end of apparatus 50. Ambient light blocker 50 generally assumes the shape of mounting ring 74 when installed.

In operation, an operator places produce item 18 on ambient light blocker 50 to allow produce data collector 14 to collect produce data for produce item 18.

Turning now to FIG. 7, produce data collector 14 primarily includes transparent window 61, light source 90, spectrometer 91, control circuitry 96, ambient light sensor 98, housing 102, and shutter 103.

Light source 90 produces light 112. Light source 90 preferably produces a white light spectral distribution, and preferably has a range from four hundred 400 nm to 700 nm, which corresponds to the visible wavelength region of light.

Light source 90 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity.

Ambient light sensor 98 senses the level of ambient light through windows 60 and 61 and sends ambient light level signals 128 to control circuitry 96. Ambient light sensor 98 is mounted anywhere within a direct view of window 61.

Spectrometer 91 includes light separating element 92, photodetector array 94.

Light separating element 92 splits light 114 in the preferred embodiment into light 120 of a continuous band of wavelengths. Light separating element 92 is preferably a linear variable filter (LVF), such as the one manufactured Optical Coating Laboratory, Inc., or may be any other functionally equivalent component, such as a prism or a grating.

Photodetector array 94 produces waveform signals 122 containing spectral data. The pixels of the array spatially sample the continuous band of wavelengths produced by light separating element 92, and produce a set of discrete signal levels. Photodetector array 94 is preferably a complimentary metal oxide semiconductor (CMOS) array, but could be a Charge Coupled Device (CCD) array.

Control circuitry 96 controls operation of produce data collector 14 and produces digitized produce data waveform signals 124. For this purpose, control circuitry 96 includes an analog-to-digital (A/D) converter. A twelve bit A/D converter with a sampling rate of 22–44 kHz produces acceptable results.

Control circuitry 96 also receives signals from ambient light sensor 98. In response to ambient light level signals 128, control circuitry 96 waits for ambient light levels to fall to a minimum level (dark state) before turning on light source 90. Ambient light levels fall to a minimum level when produce item 18 covers window 60. After control circuitry 96 has received waveform signals 122 containing produce data, control circuitry 96 turns off light source 90 and waits for ambient light levels to increase before returning to waiting for the dark state. Ambient light levels increase after produce item 18 is removed from window 61.

The presence of ambient light blocker-50 not only reduces contamination of produce readings, but also makes operation more stable. Ambient light blocker 50 minimizes triggering problems. Ambient light blocker 50 minimizes the probability that produce data collector 14 will initiate readings when a produce item is not present or fail to initiate readings when a produce item is present.

Control circuitry 96 controls shutter 103. Control circuitry 96 opens and closes shutter 103 to obtain reference readings for calibration purposes.

Window 61 includes an anti-reflective surface coating to prevent light 112 reflected from window 61 from contaminating reflected light 114.

Shutter 103 is mounted below transparent window 61. Shutter 103 may include a polymer dispersed liquid crystal (PDLC) or a motor-driven door mounted to the underside of the top wall of housing 102.

Operation of produce data collector 14 is automatic. Control circuitry 96 senses low level ambient signals 128 and turns on light source 90. Light separating element 92 separates reflected light 114 into different wavelengths to produce light 120 of a continues band of wavelengths. Photodetector array 94 produces waveform signals 122 containing produce data. Control circuitry 96 produces digitized produce data signals 124 which it sends to transaction terminal 20. Control circuitry 96 turns off light source 90 and waits for ambient light levels to increase before returning to waiting for the dark state.

FIG. 8 illustrates direct attachment of ambient light blocking apparatus to produce data collector 14.

Although the invention has been described with particular reference to certain preferred embodiments thereof, variations and modifications of the present invention can be effected within the spirit and scope of the following claims. In particular, alternate embodiments may be further reduced or enlarged in size as window 60 is made smaller or larger. Also, the number light source 90 may change, but all of these variations are incorporated in the scope of present invention and may be considered alternative embodiments.

We claim:

1. An apparatus for blocking light from entering a produce data collector comprising:

a tunnel member mounted to a scale weigh plate located above the produce data collector and extending between the produce data collector and a produce item for providing a pathway for light from the produce data collector to illuminate the produce item, reflect from the produce item, and return to the produce data collector.

2. The apparatus as recited in claim 1, wherein the tunnel member is mounted to the produce data collector.

3. The apparatus as recited in claim 1, wherein the tunnel member is generally circular and has a generally hourglass-shaped wall.

4. The apparatus as recited in claim 1, wherein the tunnel member has a concave wall.

5. The apparatus as recited in claim 1, wherein the tunnel member is made of a flexible material and wherein one end of the tunnel member substantially conforms to a shape of the produce item.

6. A checkout system comprising:

a produce data collector including a housing having a surface and a first aperture in the surface through which light passes for illuminating a produce item;

a scale weigh plate located above the produce data collector and including a second aperture in line with the first aperture; and a tunnel member mounted to the scale weigh plate and having a first opening adjoining the second aperture and a second opening upon which a produce item is placed during operation, wherein the tunnel member provides a pathway for the light to illuminate the produce item, reflect from the produce item, and return to the produce data collector.

7. A method of blocking ambient light from entering a produce data collector while the produce data collector is illuminating a produce item comprising the steps of:

surrounding an aperture in a surface of a scale weigh plate over the produce data collector by one end of a tunnel member which conforms to a shape of the surface of the scale weigh plate;

mounting the tunnel member to the surface of the scale weigh plate;

engaging the produce item by another end of the tunnel member which conforms to a shape of the produce item; and allowing only light from the produce data collector to illuminate the produce item, reflect from the produce item, and return to the produce data collector by the tunnel member.

* * * * *